US012601273B2

(12) United States Patent
Szczesnowicz

(10) Patent No.: US 12,601,273 B2
(45) Date of Patent: Apr. 14, 2026

(54) STATOR VANE BRAZE JOINTS

(71) Applicant: PRATT & WHITNEY CANADA CORP., Longueuil (CA)

(72) Inventor: Piotr Szczesnowicz, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/822,005

(22) Filed: Aug. 30, 2024

(65) Prior Publication Data

US 2026/0063043 A1 Mar. 5, 2026

(51) Int. Cl.
*F01D 9/04* (2006.01)
*F01D 25/24* (2006.01)

(52) U.S. Cl.
CPC ............. *F01D 9/041* (2013.01); *F01D 25/24* (2013.01); *F05D 2230/237* (2013.01)

(58) Field of Classification Search
None
See application file for complete search history.

(56) References Cited

U.S. PATENT DOCUMENTS 5,332,360 A 7/1994 Correia et al.
6,238,182 B1 5/2001 Mayer
6,592,287 B1 * 7/2003 Hagle .................... B23K 33/00 403/375
7,919,151 B2 4/2011 Deng et al.
8,568,826 B2 10/2013 Park et al.
8,581,466 B2 11/2013 Patel et al.
8,740,557 B2 * 6/2014 Durocher ................ F01D 9/044 416/213 R
8,753,753 B2 6/2014 Lemke et al.
9,126,279 B2 9/2015 Schick et al.
9,169,736 B2 10/2015 Hayford et al.
9,498,834 B2 11/2016 Schick et al.
9,498,835 B2 11/2016 Schick et al.
9,511,452 B2 12/2016 Pater et al.
9,573,852 B2 2/2017 Revel et al.
9,803,486 B2 10/2017 Freeman et al.
9,869,182 B2 * 1/2018 Albuzat .................. F01D 5/026
9,896,951 B2 * 2/2018 Facchinetti ............. F01D 5/188
10,174,617 B2 1/2019 Whims et al.
10,183,894 B2 * 1/2019 Nelson .................. C04B 37/006
10,471,530 B2 11/2019 Lemke et al.
10,612,402 B2 4/2020 Freeman et al.
11,338,396 B2 * 5/2022 Bulgrin .................. B23K 1/008
11,767,607 B1 * 9/2023 Krishnamurthy ...... C25D 13/22 205/160

(Continued)

OTHER PUBLICATIONS

Wayken Rapid Manufacturing, Knurling Process: Understanding Its Types, Tools, and Finishes, Jul. 7, 2023 (Year: 2023).*

(Continued)

*Primary Examiner* — Courtney D Heinle
*Assistant Examiner* — Danielle M. Christensen
(74) *Attorney, Agent, or Firm* — Bachman & LaPointe, P.C.

(57) ABSTRACT

A stator stage has: at least a first shroud being an inner diameter shroud or an outer diameter shroud; and vanes mounted to the first shroud. Each vane has a mounting foot received in an aperture in the first shroud and brazed thereto. The mounting foot has a periphery with texturing. Braze material joins the texturing to a surface of the associated aperture.

20 Claims, 6 Drawing Sheets

(56) References Cited

U.S. PATENT DOCUMENTS

| | | | |
|---|---|---|---|
| 2006/0021221 | A1 | 2/2006 | Decker |
| 2011/0081239 | A1 | 4/2011 | Durocher |
| 2020/0088050 | A1 | 3/2020 | Whittle et al. |
| 2020/0200489 | A1 | 6/2020 | McDermott |

OTHER PUBLICATIONS

Metal Arts Press, "Welding Know-How", Mar. 2012, Chapter 11, "Wetting and Capillary Action"; https://www.metalartspress.com/books/welding-know-how (Year: 2012).*

European Search Report dated Jan. 23, 2026 for European Patent Application No. 25199088.3.

* cited by examiner

STATOR VANE BRAZE JOINTS

BACKGROUND

The disclosure relates to gas turbine engines. More particularly, the disclosure relates to fixed vane mounting in stator stages.

Gas turbine engines (used in propulsion and power applications and broadly inclusive of turbojets, turboprops, turbofans, turboshafts, industrial gas turbines, and the like) typically include fixed vane stages (e.g., distinguished from variable vane stages).

One genus of turbine engine stator stage has an inner (inner diameter (ID)) shroud and an outer (outer diameter (OD)) shroud concentric therewith relative to a central axis. A circumferential array of vanes radially span a gap between the inner shroud and outer shroud. Each vane includes an airfoil extending radially between an inner diameter (ID) mounting foot and an outer diameter (OD) mounting foot. Each vane has radiused transitions between the airfoil and the mounting feet.

Each of the mounting feet has a circumscribing peripheral surface extending through an associated shroud aperture having surface. The peripheral surface is secured to the associated shroud via a braze joint.

SUMMARY

One aspect of the disclosure involves a stator stage having: at least a first shroud being an inner diameter shroud or an outer diameter shroud; and a plurality of vanes mounted to the first shroud. Each vane has a mounting foot received in an aperture in said first shroud and brazed thereto. The mounting foot has a periphery with texturing. Braze material joins the texturing to a surface of the associated aperture.

In a further embodiment of any of the foregoing embodiments, additionally and/or alternatively: each of the plurality of vanes has an airfoil; each of the mounting feet has a fillet transition to the associated airfoil; and the braze material does not extend to the fillet transition.

In a further embodiment of any of the foregoing embodiments, additionally and/or alternatively, the texturing has amplitude of at least 12.7 micrometers.

In a further embodiment of any of the foregoing embodiments, additionally and/or alternatively, the texturing comprises abrasions.

In a further embodiment of any of the foregoing embodiments, additionally and/or alternatively, the texturing comprises a knurl.

In a further embodiment of any of the foregoing embodiments, additionally and/or alternatively, the texturing comprises grooves.

In a further embodiment of any of the foregoing embodiments, additionally and/or alternatively: the first shroud is an inner diameter shroud; the stator stage has a second shroud being an outer diameter shroud; the plurality of vanes are mounted to the second shroud, each vane having a second mounting foot received in an aperture in said second shroud and brazed thereto; each second mounting foot has a periphery with texturing; and braze material joins the texturing to a surface of the associated second aperture.

In a further embodiment of any of the foregoing embodiments, additionally and/or alternatively, the first shroud is an outer diameter shroud.

In a further embodiment of any of the foregoing embodiments, additionally and/or alternatively, a gas turbine engine includes the stator stage and further comprises: one or two blade stages adjacent the stator stage.

In a further embodiment of any of the foregoing embodiments, additionally and/or alternatively, the first shroud is an unsegmented full annulus.

A further aspect of the disclosure involves a method for manufacturing the stator stage, the method comprising: for each of the mounting feet, inserting the mounting foot to the associated aperture; and brazing the mounting feet to the first shroud.

A further embodiment of any of the foregoing embodiments may additionally and/or alternatively include forming the texturing by knurling.

In a further embodiment of any of the foregoing embodiments, additionally and/or alternatively, the brazing comprises: securing the first shroud and the plurality of vanes in a fixture/jig; tack welding the plurality of vanes to the first shroud to maintain their relative position; applying a braze paste to joints between the first shroud and the plurality of vanes; and placing the assembly in an oven to melt the braze paste.

A further aspect of the disclosure involves a method for manufacturing a stator stage. The stator stage comprises: at least a first shroud being an inner diameter shroud or an outer diameter shroud; and a plurality of vanes mounted to the first shroud, each vane having a mounting foot received in an aperture in said first shroud and brazed thereto. The method comprises: for each of the mounting feet, a step for texturing a periphery of the mounting foot;

inserting the mounting foot to the associated aperture; and brazing the mounting foot to the first shroud.

A further embodiment of any of the foregoing embodiments may additionally and/or alternatively include forming precursors of the vanes by machining.

In a further embodiment of any of the foregoing embodiments, additionally and/or alternatively: each of the plurality of vanes has an airfoil; each of the mounting feet has a fillet transition to the associated airfoil; and the brazing does not leave braze material extending onto the fillet transition.

In a further embodiment of any of the foregoing embodiments, additionally and/or alternatively, the brazing comprises syringe injection of braze paste followed by oven heating.

In a further embodiment of any of the foregoing embodiments, additionally and/or alternatively, the step for texturing comprises roller die knurling.

In a further embodiment of any of the foregoing embodiments, additionally and/or alternatively, the step for texturing comprises groove cutting.

In a further embodiment of any of the foregoing embodiments, additionally and/or alternatively, the step for texturing comprises grinding.

The features of the embodiments above may be combined in any combination unless expressly indicated otherwise or technically infeasible.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
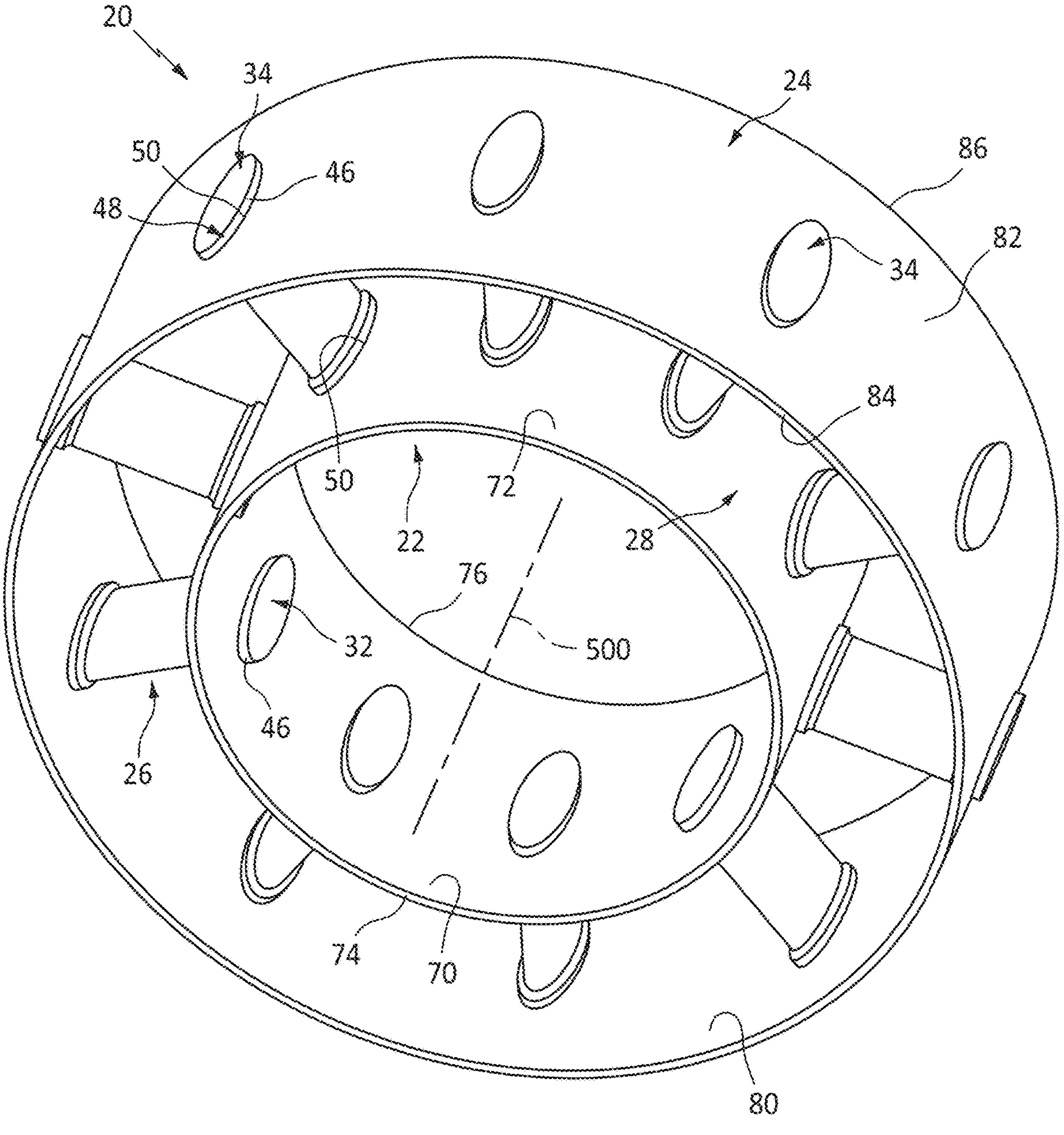
FIG. 1 is a view of a stator stage of a gas turbine engine.
Figure 2:
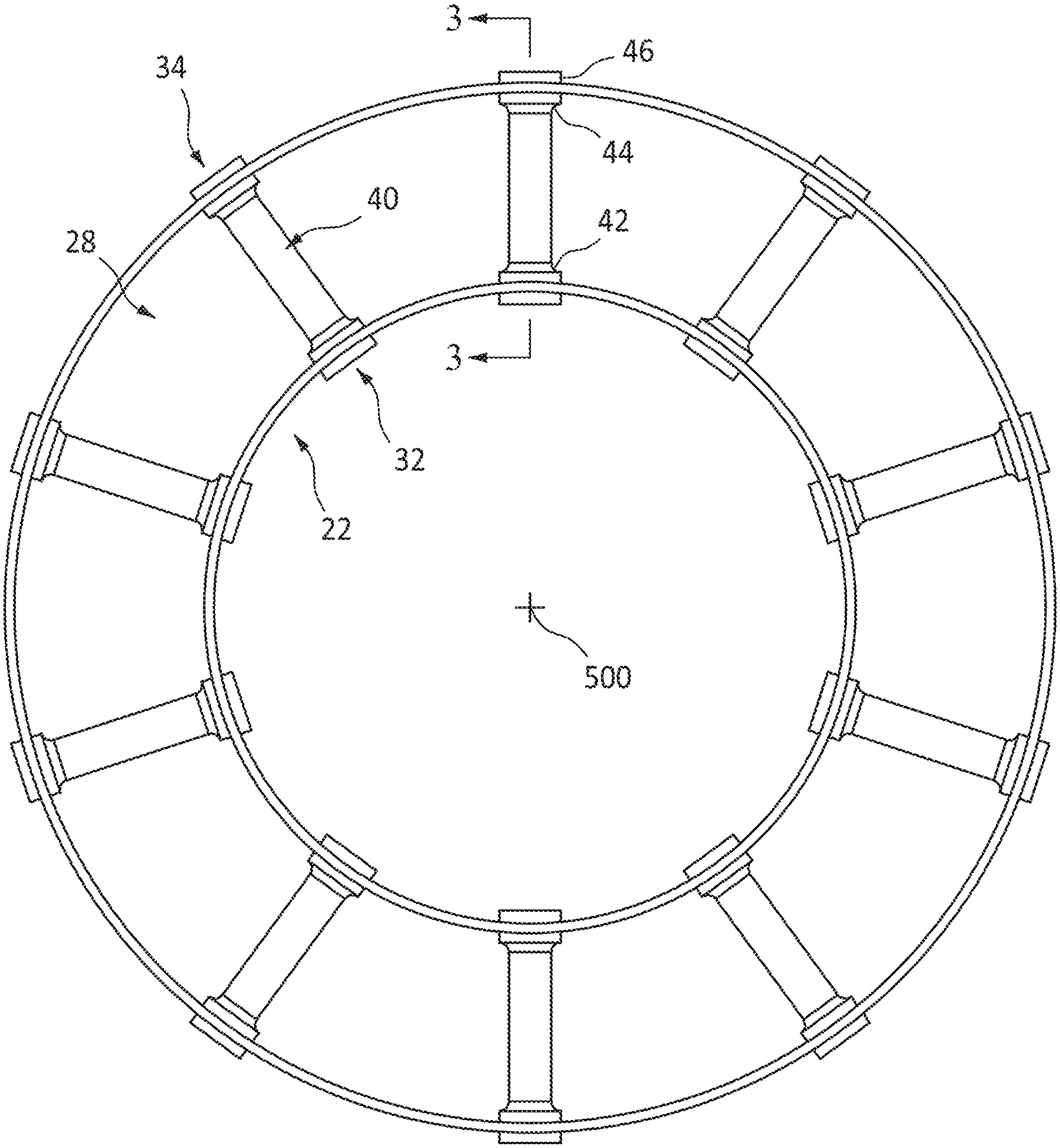
FIG. 2 is a front view of the stator stage.

FIGS. 1 and 2 show a turbine engine stator stage 20 comprising an inner (inner diameter (ID)) shroud 22 and an outer (outer diameter (OD)) shroud 24 concentric therewith relative to a central axis 500. A circumferential array of vanes 26 radially span a gap 28 between the inner shroud and outer shroud. The example shrouds are schematically illustrated as continuous monolithic right circular cylindrical shells. Nevertheless, particular locations in particular engines will typically have differing geometry including converging or diverging shrouds, segmented shrouds, and shrouds of differing streamwise/axial extents. Further variations may have a different mounting arrangement on one of the shrouds or may have only one shroud such as in so-called cantilever vanes.

Each vane 26 includes an airfoil 40 extending radially between an inner diameter (ID) mounting foot 32 and an outer diameter (OD) mounting foot 34. The airfoil has a leading edge, a trailing edge, a pressure side, and a suction side. Each vane has a radiused transition 42, 44 between the airfoil and the mounting feet 32, 34. Example mounting feet are schematically illustrated as right elliptical cylinders. Nevertheless, other shapes are possible such as more closely tracking airfoil concavity and convexity and/or accommodating shroud variations such as discussed above.

Figure 3:
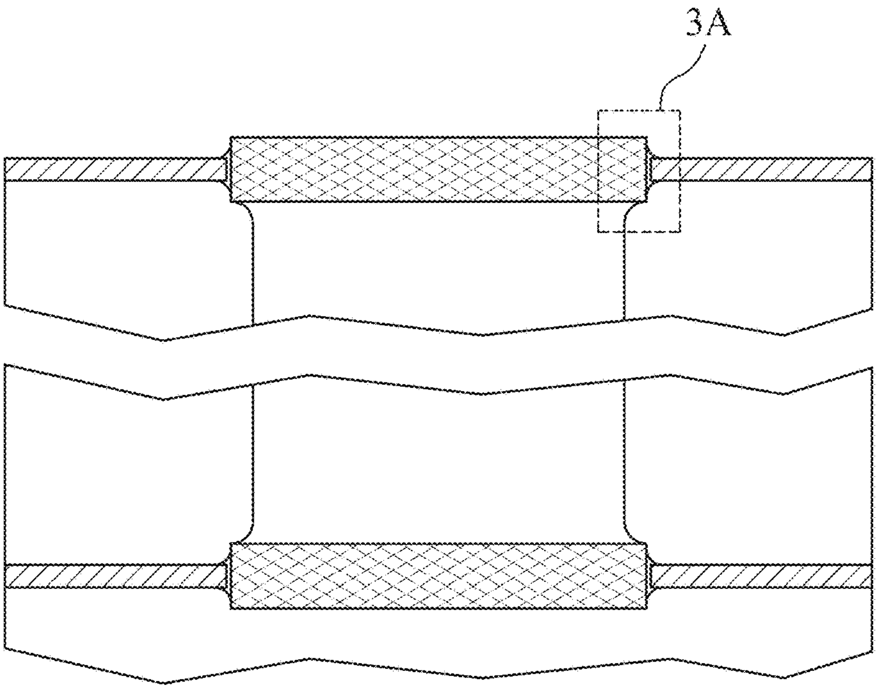
FIG. 3 is a centrally longitudinally cutaway half view of a stator vane foot to shroud joint of the stage of FIG. 2, cut away along line 3-3.
Figure 3A:
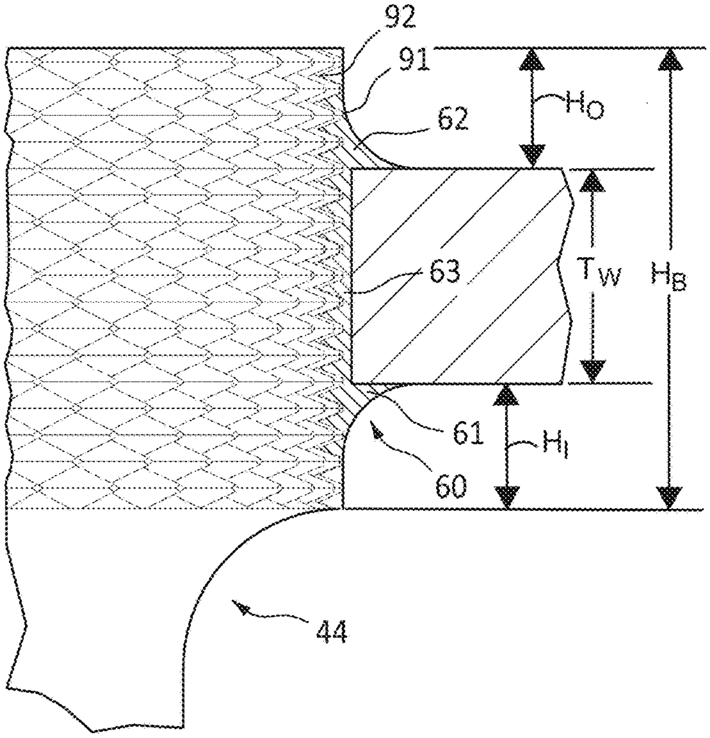
FIG. 3A is an enlarged view of the stator vane foot to shroud joint of FIG. 3.

Each of the mounting feet has a circumscribing peripheral surface 46 extending through an associated shroud aperture 48 having surface 50 (FIG. 1). The peripheral surface 46 is secured to the associated shroud via a braze joint 60 (FIG. 3A). FIG. 1 shows the ID shroud 22 having an ID surface 70, an OD surface 72, a forward/upstream end/rim 74 and an aft/downstream end/rim 76. Similarly, the OD shroud 24 has ID surface 80, OD surface 82, forward surface 84, and aft surface 86. Each of the braze joints 60 includes a fillet 61 of braze material spanning between the associated mounting foot peripheral surface 46 and the associated shroud ID surface 70, 80 on the one hand and an OD fillet 62 spanning between the mounting foot peripheral surface 46 and the shroud ID surface on the other hand. A layer 63 of braze material may span internally between the mounting foot peripheral surface 46 and the aperture 48 surface 50.

In an example modification of a baseline stator stage, the mounting foot peripheral surface is textured. A first example of texturing is a knurl/knurling 90 in FIGS. 3 and 3A.

FIG. 3A shows a wall thickness $T_W$ of the OD shroud at the aperture 48, but the same figure could schematically represent the ID shroud. A radial span or height of the non-fillet portion of the mounting foot is shown as $H_B$. This leaves a mounting foot non-fillet first portion of radial span or height $H_O$ protruding out of the gaspath (to the OD of the OD shroud or the ID of the ID shroud) and a mounting foot non-fillet second portion of radial span or height $H_I$ protruding into the gaspath (to the ID of the OD shroud or the OD of the ID shroud). In general, $H_I$ may be less than $H_O$. Minimizing $H_I$ improves aerodynamic performance. However, handling and assembly considerations may favor a larger $H_O$ such as to allow the mounting foot first portion to be engaged by a fixture and receive a pre-braze tack weld to hold the mounting foot to the shroud.

Example $T_W$ is about 0.75 to 2.0 millimeters. Example nominal (e.g., mean) $H_O$ is about 0.75 to 3.0 millimeters, more narrowly 1.0 to 2.0 millimeters. Example nominal (e.g., mean) $H_I$ is about 0 to 0.30 millimeter or 0.10 to 0.30 millimeter. In general, example $H_O$ is at least 2.0 times $H_I$ or at least about 3.0 times or an example 4.0 to 25.

The texturing may serve to accommodate braze material and prevent migration of braze material past the peripheral surface (e.g., prevent the braze material from reaching the fillets 42, 44). This is particularly significant for the mounting foot second portion of height $H_I$ in the gaspath where $H_i \ll H_O$. The example knurling 90 has peaks 91 and troughs 92 with an example amplitude of 0.010 inch (0.25 mm), more broadly 50 micrometers to 500 micrometers or 50 micrometers to 300 micrometers or 75 micrometers to 200 micrometers. For alternative ranges, the upper and lower limits form the foregoing ranges may be recombined with the counterpart from another.

Example knurling is in a diamond pattern having dimensions of 0.010 inch by 0.010 inch (0.25 mm by 0.25 mm), with alternative spacings in either direction in a range of 50 micrometers to 500 micrometers or 100 micrometers to 500 micrometers or 100 micrometers to 300 micrometers. For alternative ranges, the upper and lower limits form the foregoing ranges may be recombined with the counterpart from another. The example knurling is a roller die knurling. This is a displacive embossing process. Alternatives may include pure material removal/cutting such as engraving two intersecting parallel grove patterns. In one example, the two directions of knurling are at +45° and −45° off-radial. However, there is less sensitivity to orientation changes than with a straight linear knurl/grooving discussed below.

The texturing tends to trap and accommodate any overflow of braze material. By avoiding braze material overflowing to the fillets, 42, 44, any of several failure modes may be reduced, one failure mode involves cracking of braze material within the braze joint. The fillets and airfoil are high thermal load and high stress/strain areas. Bridged braze material on the fillets and airfoil may be subject to similar strains. Such strains may induce cracking of the braze material with cracks propagating into the joint. Or such strains may cause delamination of braze material with the delamination propagating into the joint. Another benefit of reduced/eliminated braze overflow may be an improved aerodynamic surface/performance. In particular, overflow onto or past the fillet may be prevented while overflow onto the shroud gaspath surfaces 72, 80 may be limited to a compact braze fillet 61, 62.

The texturing may thus extend through the spaces between shrouds and mounting feet and past the ID and OD surfaces of the shrouds. For example, the texturing may extend at least an example 0.25 mm (more particularly 0.25 mm to 2.5 mm or 0.25 mm to 1.0 mm) past the adjacent ID and OD surfaces of the shroud.

Figure 4:
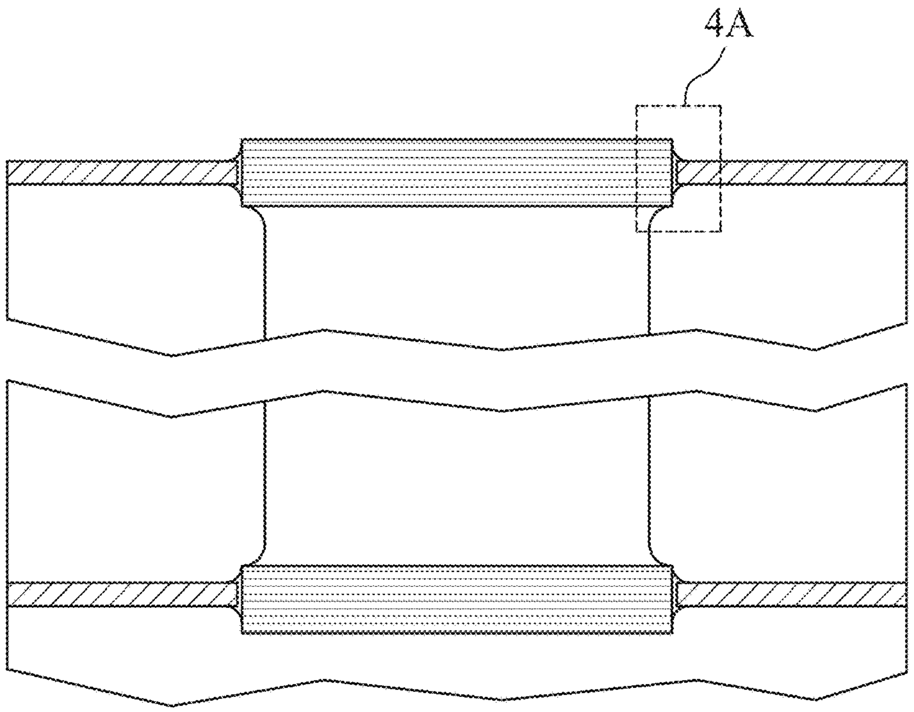
FIG. 4 is a centrally longitudinally cutaway half view of a first alternate stator vane foot to shroud joint of the stage of FIG. 2.
Figure 4A:
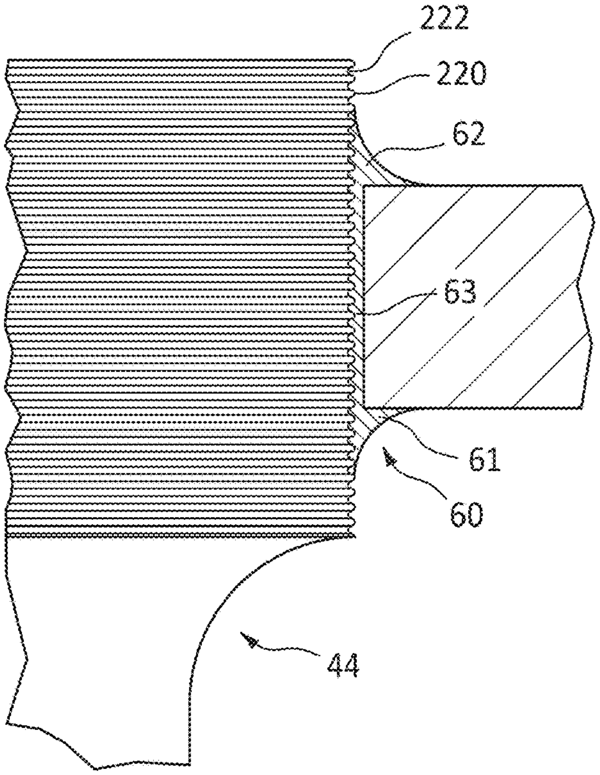
FIG. 4A is an enlarged view of the stator vane foot to shroud joint of FIG. 4.

FIGS. 4 and 4A show an alternative texturing formed by grooves 222 and lands 220 circumscribing the mounting feet. The grooves and lands may be formed by straight knurling. An alternative grooving (not shown) has grooves and lands extending generally radially relative to the centerline/axis 500 in an array around the periphery of the mounting foot. However, the circumscribing non-radial grooves may have an advantage of limiting braze material flowing away from the joint.

An example amplitude between groove and land (trough to peak) is 0.010 inch (0.25 mm), more broadly 25 micrometers to 500 micrometers or 50 micrometers to 300 micrometers or 75 micrometers to 200 micrometers. For alternative ranges, the upper and lower limits form the foregoing ranges may be recombined with the counterpart from another.

Example on-center spacing of the lands/peaks is 0.010 inch (0.25 mm), more broadly 25 micrometers to 500 micrometers or 50 micrometers to 300 micrometers or 75 micrometers to 200 micrometers. For alternative ranges, the upper and lower limits form the foregoing ranges may be recombined with the counterpart from another.

Example trough to peak height is about the same as the on center spacing of lands or grooves, more broadly example trough to peak height to on-center spacing ratio is 1:4 to 2:1 or 1:4 to 1.5:1). Also shapes other than square are possible (e.g., triangular waveform).

Figure 5:
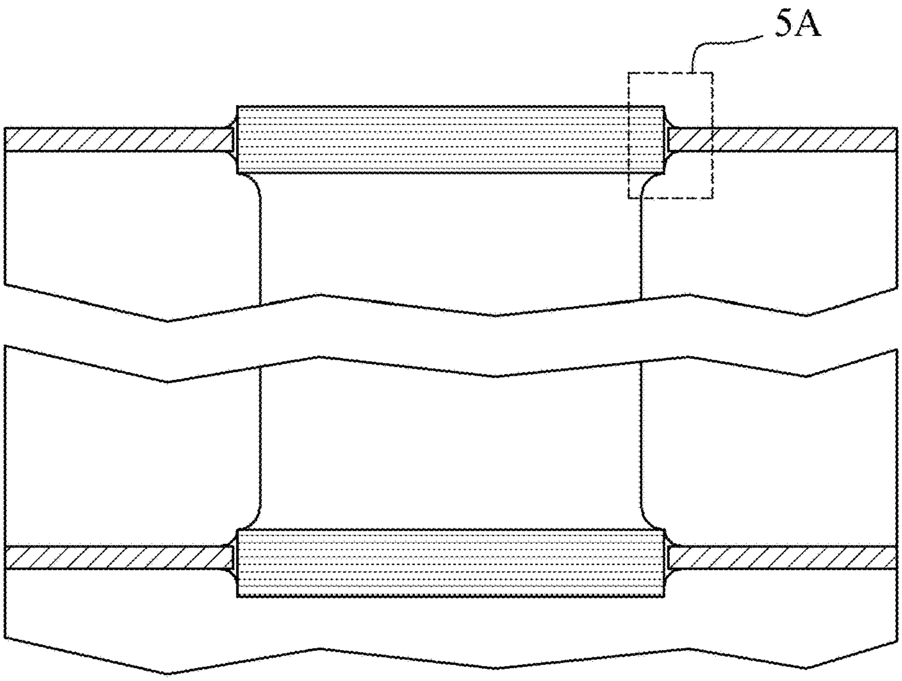
FIG. 5 is a centrally longitudinally cutaway half view of a second alternate stator vane foot to shroud joint of the stage of FIG. 2.
Figure 5A:
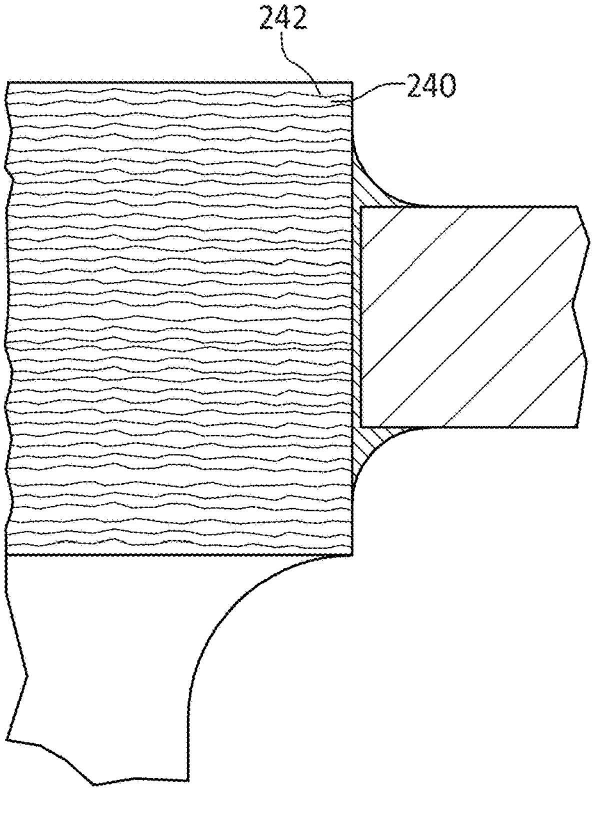
FIG. 5A is an enlarged view of the stator vane foot to shroud joint of FIG. 5.

FIGS. 5 and 5A show texturing formed by coarse abrasion such as grinding or sanding. This produces less regular grooves 240 and lands 242 of an amplitude of at least about 0.00050 inch (12.7 micrometers), more particularly at least 20 micrometers or 20 micrometers to 100 micrometers or 20 micrometers to 50 micrometers. For alternative ranges, the upper and lower limits form the foregoing ranges may be recombined with the counterpart from another. Alternatively, this may be measured as an Ra roughness. Example roughness is at least 10 micrometers Ra, more particularly an example 12 to 50 micrometers Ra.

Figure 6:
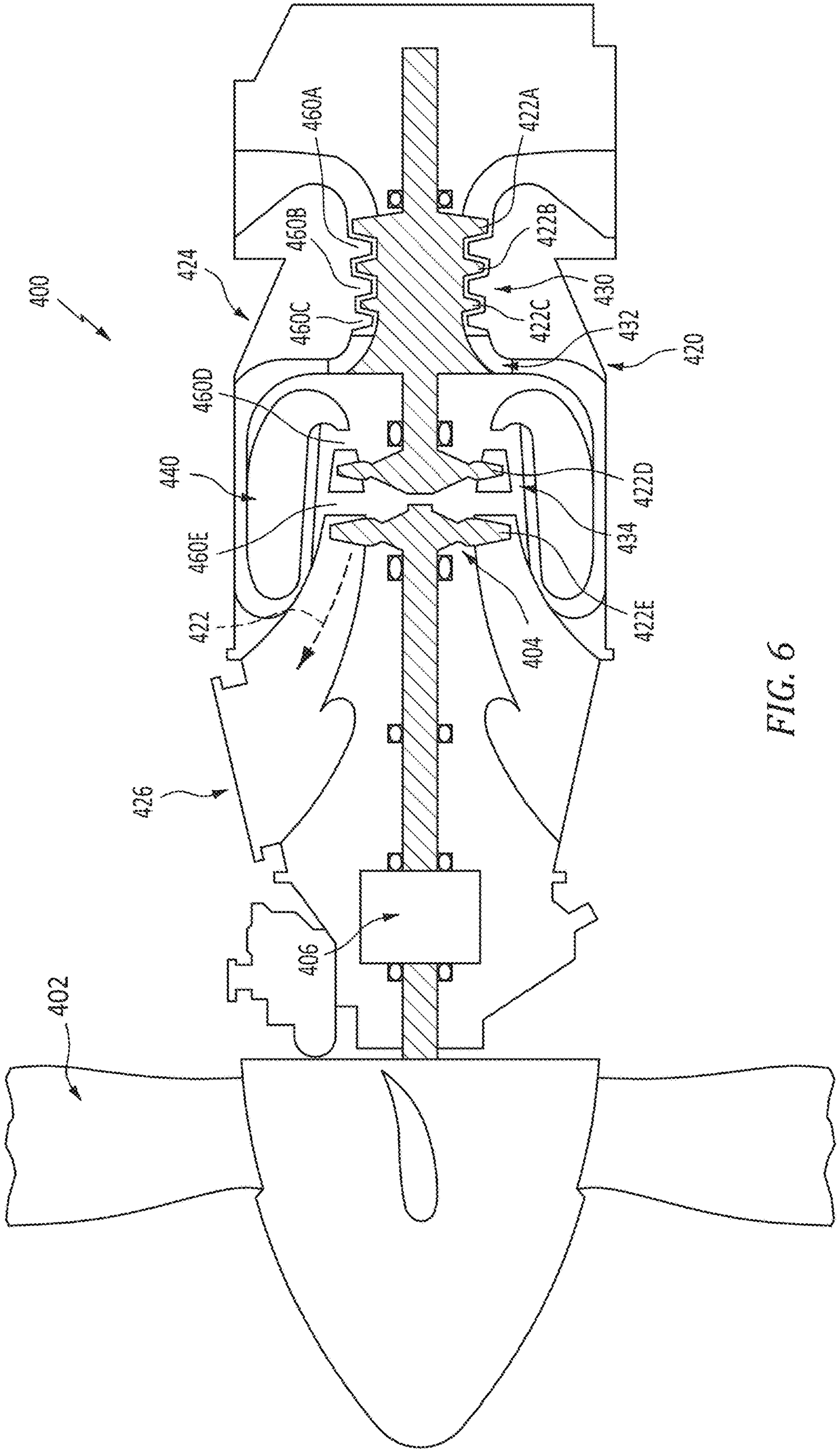
FIG. 6 is a schematic sectional view of a gas turbine engine showing stator stage locations.

FIG. 6 shows an example gas turbine engine 400 as a turboprop. In the particular engine, the propeller 402 is driven by a free turbine (power turbine) 404 via a reduction gearbox 406. A gas generator 420 has its own spool with, from upstream to downstream along a flowpath 422 from an air inlet 424 to an exhaust outlet 426, an axial compressor 430, a centrifugal compressor 432, and a compressor turbine 434 to drive the compressors. A combustor 440 is between the centrifugal compressor and the compressor turbine along the flowpath 422. The power turbine 404 is between the compressor turbine and the outlet along the flowpath.

Example vane stages which may correspond to the stage 20 (or a cantilever variant) are shown as 460A, 460B, 460C, 460D, 460E. Depending on engine configuration, such stator stages may be adjacent one or two blade stages 422A, 422B, 422C, 422D, 422E.

Example manufacture process may follow any appropriate baseline process or yet developed process with the addition of the texturing step. The texturing may, however, be associated with some slight change in dimensional parameters from a baseline with a smooth mounting foot periphery. For example, material displacement during a knurling can necessitate slightly under-sizing the mounting foot relative to the baseline or slightly over-sizing the mounting aperture in the shroud. Alternatively, to such material displacement process, a material removal process such as a coarse grinding may be associated with over-sizing of the mounting foot or under-sizing of the aperture relative to the baseline.

Component materials and manufacture techniques and assembly techniques may be otherwise conventional. In one example, the basic vanes (absent the texturing) are manufactured of stainless steel by milling. Their mounting feet are then textured as discussed above.

The ID and OD shrouds may be manufactured of stainless steel by turning.

The vanes are assembled to the shrouds and held in a fixture/jig before being tack welded for positioning purposes only. Braze alloy (e.g., silver-based braze) is introduced to the gaps between the shroud(s) and stator vane feet (e.g., via a manual or automated syringe injecting a braze paste). To facilitate this introduction, there may be a nominal clearance between the feet (e.g., the peaks of the knurl, the rims of the lands, or the high spots left after abrasion) and the inner surface 50 of the associated aperture 48. The example nominal clearance is about 0.007 inch (0.178 mm), more broadly 150 micrometers to 300 micrometers or 175 micrometers to 250 micrometers. Due to assembly tolerances, there may be contact at some points around the periphery of the foot but this will mean greater contact elsewhere. The example braze process comprises placing the assembly in an oven to melt the braze.

After brazing, there may be further processing steps such as painting, coating, and the like.

The use of “first”, “second”, and the like in the following claims is for differentiation within the claim only and does not necessarily indicate relative or absolute importance or temporal order. Similarly, the identification in a claim of one element as “first” (or the like) does not preclude such “first” element from identifying an element that is referred to as “second” (or the like) in another claim or in the description.

One or more embodiments have been described. Nevertheless, it will be understood that various modifications may be made. For example, when applied to an existing baseline engine or stator stage configuration, details of such baseline may influence details of particular implementations. Accordingly, other embodiments are within the scope of the following claims.

What is claimed is:

1. A stator stage comprising:

at least a first shroud being an inner diameter shroud or an outer diameter shroud; and a plurality of vanes mounted to the first shroud, each vane having a mounting foot received in an aperture in said first shroud and brazed thereto, wherein:

the mounting foot has a periphery with texturing;

the texturing extends past an adjacent surface of the first shroud;

braze material joins the texturing to a surface of the associated aperture;

each of the plurality of vanes has an airfoil;

each of the mounting feet has a concave fillet transition to the associated airfoil; and the braze material does not extend to the fillet transition.

2. The stator stage of claim 1 wherein:

the texturing has amplitude of at least 12.7 micrometers.

3. The stator stage of claim 1 wherein:

the texturing comprises abrasions.

4. The stator stage of claim 1 wherein:

the texturing comprises a knurl.

5. The stator stage of claim 1 wherein:

the texturing comprises grooves.

6. The stator stage of claim 1 wherein:

the first shroud is an inner diameter shroud;

the stator stage has a second shroud being an outer diameter shroud;

the plurality of vanes are mounted to the second shroud, each vane having a second mounting foot received in an aperture in said second shroud and brazed thereto;

each second mounting foot has a periphery with texturing; and braze material joins the texturing to a surface of the associated second aperture.

7. The stator stage of claim 6 wherein:

the texturing extends past adjacent inner diameter and outer diameter surfaces of the first shroud;

each of the second mounting feet has a second fillet transition to the associated airfoil; and the braze material does not extend to the second fillet transition.

8. The stator stage of claim 1 wherein:

the first shroud is an outer diameter shroud.

9. A gas turbine engine including the stator stage of claim 1 and further comprising:

one or two blade stages adjacent the stator stage.

10. The gas turbine engine of claim 9 wherein:

the first shroud is an unsegmented full annulus.

11. A method for manufacturing the stator stage of claim 1, the method comprising:

for each of the mounting feet, inserting the mounting foot to the associated aperture; and brazing the mounting feet to the first shroud.

12. The method of claim 11 further comprising:

forming the texturing by knurling.

13. The method of claim 11 wherein the brazing comprises:

securing the first shroud and the plurality of vanes in a fixture/jig;

tack welding the plurality of vanes to the first shroud to maintain their relative position;

applying a braze paste to joints between the first shroud and the plurality of vanes; and placing the assembly in an oven to melt the braze paste.

14. A method for manufacturing a stator stage, the stator stage comprising:

at least a first shroud being an inner diameter shroud or an outer diameter shroud; and a plurality of vanes mounted to the first shroud, each vane having an airfoil and a mounting foot received in an aperture in said first shroud and brazed thereto, the method comprising:

for each of the mounting feet, a step for texturing a periphery of the mounting foot;

inserting the mounting foot to the associated aperture; and brazing the mounting foot to the first shroud, wherein the texturing extends past an adjacent surface of the first shroud and the braze material does not extend to a concave fillet transition to the airfoil.

15. The method of claim 14 further comprising:

forming precursors of the vanes by machining.

16. The method of claim 14 wherein:

each of the plurality of vanes has an airfoil;

each of the mounting feet has a fillet transition to the associated airfoil; and the brazing does not leave braze material extending onto the fillet transition.

17. The method of claim 14 wherein:

the brazing comprises syringe injection of braze paste followed by oven heating.

18. The method of claim 14 wherein:

the step for texturing comprises roller die knurling.

19. The method of claim 14 wherein:

the step for texturing comprises groove cutting.

20. The method of claim 14 wherein:

the step for texturing comprises grinding.

* * * * *